US005413841A

United States Patent [19]

Mahn, Sr. et al.

[11] Patent Number: 5,413,841

[45] Date of Patent: May 9, 1995

[54] HEAT ACTIVATED TRANSFERS WITH MACHINE READABLE INDICIA

[76] Inventors: John E. Mahn, Sr., 10455 Deer Trail, Hamilton, Ohio 45030; John E. Mahn, Jr., 6154 Oakhaven Dr., Cincinnati, Ohio 45238

[21] Appl. No.: 149,006

[22] Filed: Nov. 8, 1993

Related U.S. Application Data

[63] Continuation of Ser. No. 757,687, Sep. 11, 1991, abandoned.

[51] Int. Cl.[6] .................. B32B 3/00

[52] U.S. Cl. .................. 428/195; 428/484; 428/488.1; 428/488.4; 428/224; 428/287; 428/913; 428/914

[58] Field of Search .................. 428/195, 484, 488.1, 428/488.4, 913, 914, 224, 284, 287

[56] References Cited

U.S. PATENT DOCUMENTS

| | | | |
|---|---|---|---|
| 2,911,280 | 11/1959 | Cicogna | 8/2.5 |
| 3,502,495 | 3/1970 | Akamatsu | 117/38 |
| 3,508,492 | 4/1970 | Seibert et al. | 101/470 |
| 4,021,591 | 5/1977 | DeVries et al. | 428/200 |
| 4,058,644 | 11/1977 | DeVries | 428/200 |
| 4,202,663 | 5/1980 | Haigh et al. | 8/471 |
| 4,576,610 | 3/1986 | Donenfeld | 8/471 |
| 4,610,904 | 9/1986 | Mahn, Sr. et al. | 428/79 |
| 4,977,134 | 12/1990 | Jongewaard et al. | 503/227 |

FOREIGN PATENT DOCUMENTS

| | | | |
|---|---|---|---|
| 0234563 | 9/1987 | European Pat. Off. | 503/227 |

*Primary Examiner*—Patrick J. Ryan
*Assistant Examiner*—Elizabeth Evans

[57] ABSTRACT

A heat activated transfer is formed having a lower thermoplastic or thermoactive adhesive layer, an upper transparent thermoset layer and indicia. The indicia is formed from sublimation dye or diffusion dye which is heat transferred into the thermoset material, preferably as the heat activated transfer is being applied to a cloth substrate. This permits printing and application of individual unique indicia on each individual heat activated transfer at a very low cost. Due to the extreme clarity of the formed product as well as the ease by which different unique indicia can be provided with each heat activated transfer, this method and product is uniquely suitable for use in preparing coated machine-readable indicia such as bar codes. This permits inventory control for cloth items such as hospital garments, linen and the like. It also permits uniforms and the like to be marked with the individual user's name at a relatively low cost.

8 Claims, 1 Drawing Sheet

HEAT ACTIVATED TRANSFERS WITH MACHINE READABLE INDICIA

This application is a continuation of application Ser. No. 07/757,687 filed Sep. 11, 1991, now abandoned.

BACKGROUND OF THE INVENTION

Machine readable characters are used for a variety of different applications. Particularly, bar codes are employed in identifying products in stores. In these applications, one number or bar code is applied to all identical articles. The bar codes are almost always printed on the packaging.

Bar codes can also be used as a means for inventory control and identification and location of goods or other articles. This may require a separate bar code for each and every item. This is possible where the bar code is printed on a paper material that has an adhesive backing. This will not work, however, in applications where the bar code must be applied to a cloth substrate which is subjected to an industrial laundry. Mere pressure sensitive adhesives will not withstand any laundering. The extreme conditions of an industrial laundry cause even most heat activated transfers to separate from the article of clothing, delaminate or cause the indicia to dissolve.

A bar code must be clear and sharp. If the bar code or other indicia is not clearly discernible, it cannot be machine read. It also will be very unattractive.

It is possible in many applications to preprint a bar code within a laminant so that separate lamina are on either side of the bar code. These laminae protect the bar code. A problem with this, however, is delamination. Again, particularly with commercial laundry conditions, delamination is an extremely significant problem.

Mahn U.S. Pat. No. 4,610,904 discloses a heat activated transfer having a bar code which does not delaminate. But the bar code must be produced by a screen printing process or similar manner. The bar code may also have to be overcoated with an outer clear layer. This would work if one was applying the same bar code to hundreds of items. But this is impractical for applying a different bar code to each different item.

Thus, for a coded label to function on an item subjected to an industrial laundry, it must withstand the conditions of the commercial laundry. There must also be an effective way to apply the code onto the label. Further, the bar code must not delaminate or fade and must be clear and machine readable.

SUMMARY OF THE INVENTION

The present invention is premised on the realization that a heat activated transfer having indicia which is sharp enough to be machine readable can be produced by providing a laminate having a lower layer which is a thermoactive adhesive layer or includes a thermoactive adhesive layer, and an upper layer which is a clear thermoset plastic, and applying onto the thermoset layer an indicia layer which is formed from a sublimation or diffusion dye.

Preferably, the machine readable indicia is applied directly to the thermoset layer as the adhesive layer is being bonded to a cloth substrate. The heat required to melt and adhere the adhesive to a cloth substrate acts to transfer the dye onto the thermoset layer.

Preferably, the lower layer is an adhesive which bonds the transfer to a cloth substrate and provides a background which keeps the sublimation dye crisp and clear so that it can be easily machine read. Preferably, the thermoset layer is a clear thermoset polyurethane layer.

The present invention is particularly adapted to provide machine readable bar codes on articles which are subjected to industrial laundry such as work clothing, hospital clothing and bedding.

The objects and advantages of the present invention will be further appreciated in light of the following detailed description and drawings wherein:

DETAILED DESCRIPTION

Figure 1:
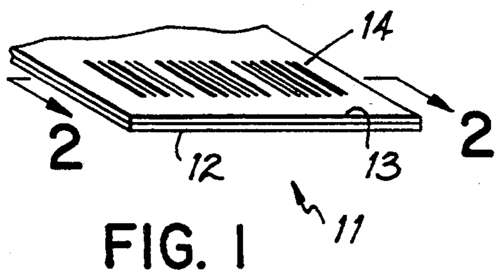
FIG. 1 is prospective view of a heat activated transfer according to the present invention having indicia with the machine readable bar code.
Figure 2:
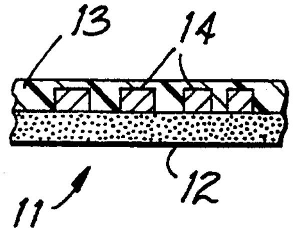
FIG. 2 is a cross sectional view taken at lines 2—2 of FIG. 1.

The present invention is a heat activated transfer as shown in FIG. 1. The transfer 11 includes a lower adhesive layer 12 and an upper thermoset layer 13. As shown in FIG. 2, indicia layer 14 formed from a sublimation dye is located within the upper thermoset layer 13.

The lower layer 12 must be an adhesive layer which is thermoplastic or thermoactive. It is selected so that it will adhere to the substrate to which it is applied. It must also have a melting or activation temperature which is at or above the sublimation or diffusion temperature of the dye used to form indicia 14.

In application, there are a number of different thermoplastic materials that are suitable for use in the present invention. Preferably, this will be a thermoplastic polymer having a high melting point, one which does not flow at temperatures less than 350° F. and, preferably, not less than 400° F. For certain markets, adhesives with lower melting points such as 200° F. can be used.

A thermoplastic layer should be one which can be easily removed from a garment either by heat or solvent. Suitable thermoplastics include polyesters, polyamides, polyurethanes and polyethers. High melt polyurethanes are preferred and can be removed with dimethyl formaldehyde as well as cyclohexanol. Polymers such as polyvinylchloride are not easily removed by solvents since they tend to totally dissolve into the solvents and sink into the garments permanently marring the garments.

A preferred adhesive is a polyurethane thermoplastic made by Morton International (formerly the K. J. Quinn Company in Maldon, Mass.), PS455. This product has a shore A hardness of 85–90, shore D hardness of 35–40 and a melting temperature of 400°–420° F. This can be clear or tinted for example by adding up to 4% $TiO_2$. Also suitable is Emhart Bostic 4117 brand polyester thermoplastic having a softening point of 225° F. A thermosettable linear saturated polyester adhesive sold as Bostic 10-300-3 is also suitable particularly for nylon fabric. Another suitable polyester adhesive can be purchased from Goodyear. The polyurethane adhesive sold by Morton International is good for a wide range of fabrics including polyester and polyester blends with wool and cotten, wool, cotton and triacetate. A nylon based adhesive EMS1G sold by EMS Industries can also be used.

The upper thermoset layer can be formed from a variety of different materials. These are all clear thermoset materials including thermoset polyamides, thermoset polyurethanes, thermoset polyolefins, thermoset polyepoxides, and thermoset polyesters.

The preferred thermoset layer is a clear thermoset polyurethane such as Zephyrion brand sold by Sinclair and Valentine Chemical Coating Groups of Wheelabrator-Frye, Inc. of North Kansas City, Mo. This is disclosed more fully in Mahn U.S. Pat. No. 4,610,904. Thermoset cross-link resin sold by SubliPress, Inc. and thermoset epoxy sold under the name Coat-um by Nova Chrome Inc. also function.

The upper thermoset layer should have a thickness of from about 2 mils to about 0.05 mils with about 1 to about 0.1 mils being preferred. Most preferred is about 0.5 mils.

For use in the present invention, the adhesive layer 12 is prebonded to the thermoset layer 13 by a lamination process or coating process. A preferred laminate for use in the present invention is disclosed in Mahn et al. U.S. Pat. No. 4,610,904, the disclosure of which is incorporated herein by reference.

The sublimation or diffusion dye layer 14 can be formed from any of a variety of well known sublimation or diffusion dyes which are suitable for application to the thermoset layer 13. They are generally used to apply indicia to woven materials.

Generally, the dispersed dyes listed in the Colour Index under the heading Dispersed Dyes are suitable. These include, for example, azo, anthraquinone, quinophthalone, nitro, azomethine, and styryl-type dyes. These are disclosed, for example, in Donenfeld U.S. Pat. No. 4,576,610, Seibert U.S. Pat. No. 3,508,492, Haigh U.S. Pat. No. 4,202,663, DeVires U.S. Pat. No. 4,021,591, Gilardone U.S. Pat. No. 4,654,044, Cicogna U.S. Pat. No. 2,911,280, and Akamatsu U.S. Pat. No. 3,502,495. One commercially available sublimation dye is sold by Xpress Company of Winston Salem, N.C. This is particularly good for offset printing applications. Others sold by Fugi KK and Eastman Kodak diffusion dye (referred to as thermal transfer diffusion donor material) are also suitable. A dye which is suitable for application with a lithographic press is sold by Roach Inc. Dyes which can be applied with a dot matrix printer are sold by Pearl Worldwide.

These dyes can be printed or transferred onto a transfer sheet which will withstand the temperature of this or diffusion and release the dye at or below sublimation temperature. Suitable methods for printing the dye onto the transfer sheet include thermal transfer, offset printing lithographic printing and dot matrix printing. Suitable heat transfer printers are sold by Seiko, Zebra (140) and Fargo (Prodigy Plus).

The transfer sheet is typically paper coated with a release coating such as wax, high molecular weight polyethylene glycols, low molecular weight polyethylene, polytetraflouroethylene silicone or stearic acid.

Figure 3:
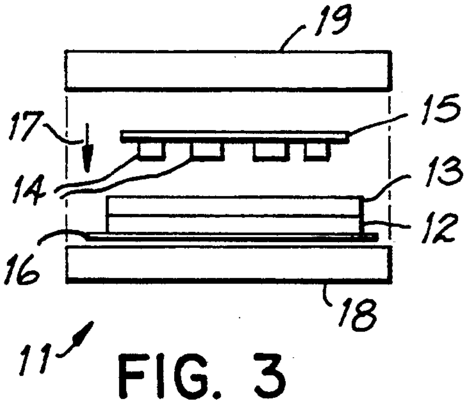
FIG. 3 is a diagrammatic view of the method of forming and applying the heat activated transfer of the present invention.

FIG. 3 is a diagrammatic depiction of a method of applying a heat activated transfer of the present invention. In this application, the thermoplastic layer 12 is prebonded to the thermoset layer 13. These can be, for example, the materials disclosed in Mahn U.S. Pat. No. 4,610,904. The dye 14 is printed onto the transfer sheet 15. The thermoplastic layer 12 is placed against a cloth substrate 16 and the release sheet 15 is applied on the thermoset layer 13 with the sublimation dye 14 between the two as shown by arrow 17. These are then placed between two heated platens 18 and 19 which apply pressure and temperature against the composite causing the adhesive layer 12 to melt and flow into the cloth layer to bond it to the cloth layer along with the thermoset layer 13. The same temperature and pressure will cause the sublimation dye to sublime and the individual molecules will flow into the thermoset layer 13 permanently marking that layer 13. Generally, five to ten seconds is required. Temperatures, generally, will vary from 300° to 400° F. with applied pressure up to 80 psi.

Heat activated transfers of the present invention can also be formed by printing or transferring the sublimation dye onto the outer layer 12 and subsequently applying the transfer 11 to a cloth layer. The heat required to bond the transfer 11 to the garment will cause the dye to sublime and migrate into the transfer 11.

Figure 4:
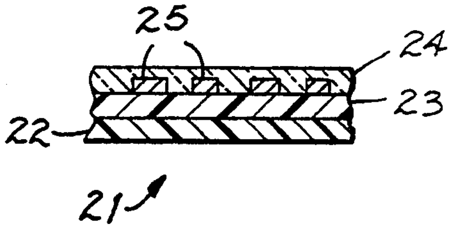
FIG. 4 is a cross section view of an alternate embodiment of the present invention.

In an alternate embodiment shown in FIG. 4, the heat activated transfer 21 can include a lower thermoplastic layer 22, an intermediate layer 23 and an outer clear layer 24. The indicia 25, which is the sublimation dye, resides on the intermediate layer 23. The intermediate layer 23 can be a variety of different materials including thermoset and thermoplastic materials. These can be, for example, polyamides, polyurethanes, polyolefins, polyepoxies and polyesters. This would generally be an opaque material. A preferred thermoset is a thermoset polyurethane ink such as Zephyrion, pigmented polyurethane sold by Sinclair and Valentine Chemical Coating Groups of Wheelabrator-Frye, Inc. of North Kansas City, Mo. Other materials that would be suitable for use in this application would include microporous polyurethanes such as Permair brand microporous polyurethane, sold by Porvair Ltd., and microporous silicone such as Teslin brand material, sold by PPG Industries. This intermediate layer must not melt at temperatures lower than 270° F. and preferably be a thermoset material. The thickness of this intermediate layer can range from 0.5 mils up to 25 mils and, preferably, is from 3 mils to 20 mils.

These will be further appreciated in light of the following examples.

EXAMPLE 1

A heat activated transfer was formed having a 5 mil thick adhesive layer which was white polyurethane adhesive (containing 4% $TiO_2$) sold under the name PS-455 by Morton International and a 0.5 mil thick upper layer which was a clear polyurethane thermoset sold under the trade name Zephrylon by Wheelabrator-Frye.

A thermal dye diffusion donor material sold by Eastman Kodak was heat transferred onto a transfer sheet using a thermal printer. The adhesive layer was placed on a cloth substrate and the transfer sheet was placed on the upper layer with the sublimation dye contacting the upper layer. Two heated platens (400° F. 80 psi and 8 seconds) were used, simultaneously bonding the transfer to the cloth substrate and causing the sublimation dye to migrate into the upper layer.

This same process was repeated using a sublimation dye sold by Fuji KK.

EXAMPLE 2

A heat activated transfer was formed having a 5 mil thick adhesive layer which is unpigmented polyurethane adhesive (PS-455), a middle layer of 20 mil thermoset white microporous polyurethane (Porvair brand) and an upper layer of Zephrylon brand clear polyurethane.

Indicia was thermal transfered onto the upper polyurethane layer from Eastman Kodak brand thermal dye diffusion donor material. This transfer was then bonded to a cloth substrate by application of pressure (80 psi) and temperature (400° F.) for 8 seconds.

Indicia was also applied to the same substrate from Fuji KK sublimation dye ribbon as described in Example 1.

As previously discussed, the sublimation dye can be printed on the surface of thermoset layer 13 prior to application to a garment. During application, a cloth or paper layer can be placed between the sublimation dye and the heated platen to absorb excess dye if necessary. The dye can also be heat transferred into layer 13 prior to application, either before application of the adhesive or after application of this adhesive.

If it is desirable to remove the indicia, this can be done by applying heat or solvent to dissolve the thermoplastic layer 12. Alternately a new transfer can be applied directly to the top surface with an adhesive layer adhering to the thermoset layer 13.

For use with a bar code, the thermoset layer 13 is preferably a white layer with the sublimation dye 14 being black. However, the thermoplastic material can be any color and the sublimation dye, likewise, can be a different color. Also, the thermoset layer 13 can be a light colored polyurethane layer. In some applications, it may be desirable for all layers to be clear. This provides a very clear image on a cloth garment.

As previously discussed, this invention provides a number of different advantages. The foremost is the combination of providing a clear, crisp machine readable indicia which can be individually formed and bonded onto a cloth substrate. This then can be subjected to the high temperatures of industrial laundry. This is a very flexible procedure and can be used with a variety of different printers and a variety of different methods of applying the indicia during application or before application or even subsequent to application.

Further, the present invention is very rapid. Generally, the transfer of a sublimation dye to a garment requires 15 seconds to a minute. Under the present invention, the sublimation dye can be applied to film in less than a second and can be applied to a garment in about 3 seconds. Further, when compared to applying a sublimation dye directly to a garment, the present invention provides crisp, clear lines, bolder colors and avoids any re-deposition during wash.

The product is suitable for use with a variety of different colors and designs. For example, different colored opaque material can be used to designate the day of the week, that the code is applied.

The transfer of the present invention can also be put on a variety of different fabrics, including dark fabrics. Sublimation dyes cannot go directly on dark cloth. Further, sublimation dyes work best with polyurethane and polyesters and do not work well with cotton and acetate. The present invention works well with all of these fabrics.

The advantages of the present invention make this uniquely suitable for application for printing and applying a bar code having a number to a first garment and then to a second garment, printing and applying a bar code having a different number and so on for subsequent garments. This provides a unique method of loss control for garments which are subjected to industrial laundries.

The preceding has been a description of the present invention along with the preferred embodiment currently known. However, the invention should only be defined by the appended claims wherein we claim:

We claim:

1. A heat activated transfer comprising a thermoactive adhesive lower layer bonded to a transparent thermoset upper layer; and indicia comprising a sublimation dye heat transferred into said thermoset upper layer wherein said heat activated transfer is heat bonded to a cloth substrate by said thermoactive adhesive.

2. The heat activated transfer claimed in claim 1 wherein said upper layer is a polyurethane layer.

3. The heat activated transfer claimed in claim 1 wherein said adhesive layer is an opaque layer.

4. The heat activated transfer claimed in claim 3 wherein said upper layer is selected for the group consisting of thermoset polyurethanes, polyamides, polyepoxies and polyesters.

5. The heat activated transfer claimed in claim 1 further comprising an opaque layer intermediate, said adhesive layer and said upper layer.

6. The heat activated transfer claimed in claim 1 wherein said thermoactive adhesive is selected from the group consisting of thermoplastic polyurethane adhesives and thermosetable linear unsaturated polyester adhesives.

7. A heat activated transfer bonded to a cloth substrate consisting of a thermoactive adhesive lower layer bonded to a transparent thermoset upper layer and indicia comprising a sublimation dye heat transferred into said thermoset upper layer wherein said upper layer is selected from the group consisting of thermoset polyurethanes, polyamides, polyepoxides, and polyesters, and wherein said adhesive layer is an opague layer.

8. A heat activated transfer bonded to a cloth substrate consisting of a thermoactive adhesive lower layer bonded to an opague intermediate layer in turn bonded to a transparent upper layer and indicia wherein said indicia is a sublimation dye heat transferred into said thermoset upper layer.

* * * * *